Feb. 14, 1961 P. G. CARLSON 2,971,334
GAS TURBINE ENGINE ADAPTABLE FOR MULTI-PURPOSE USE
Filed Jan. 4, 1955 7 Sheets-Sheet 6

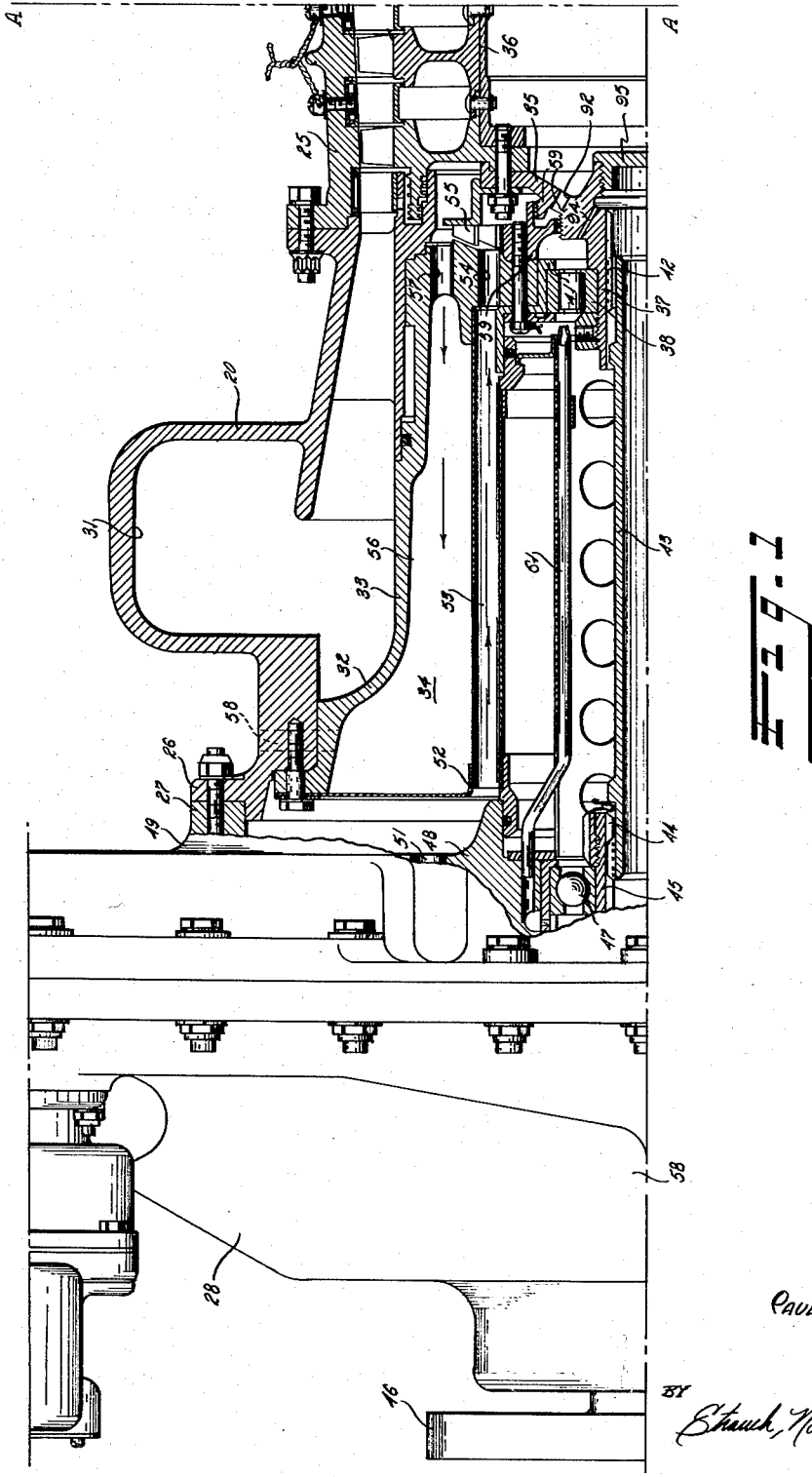

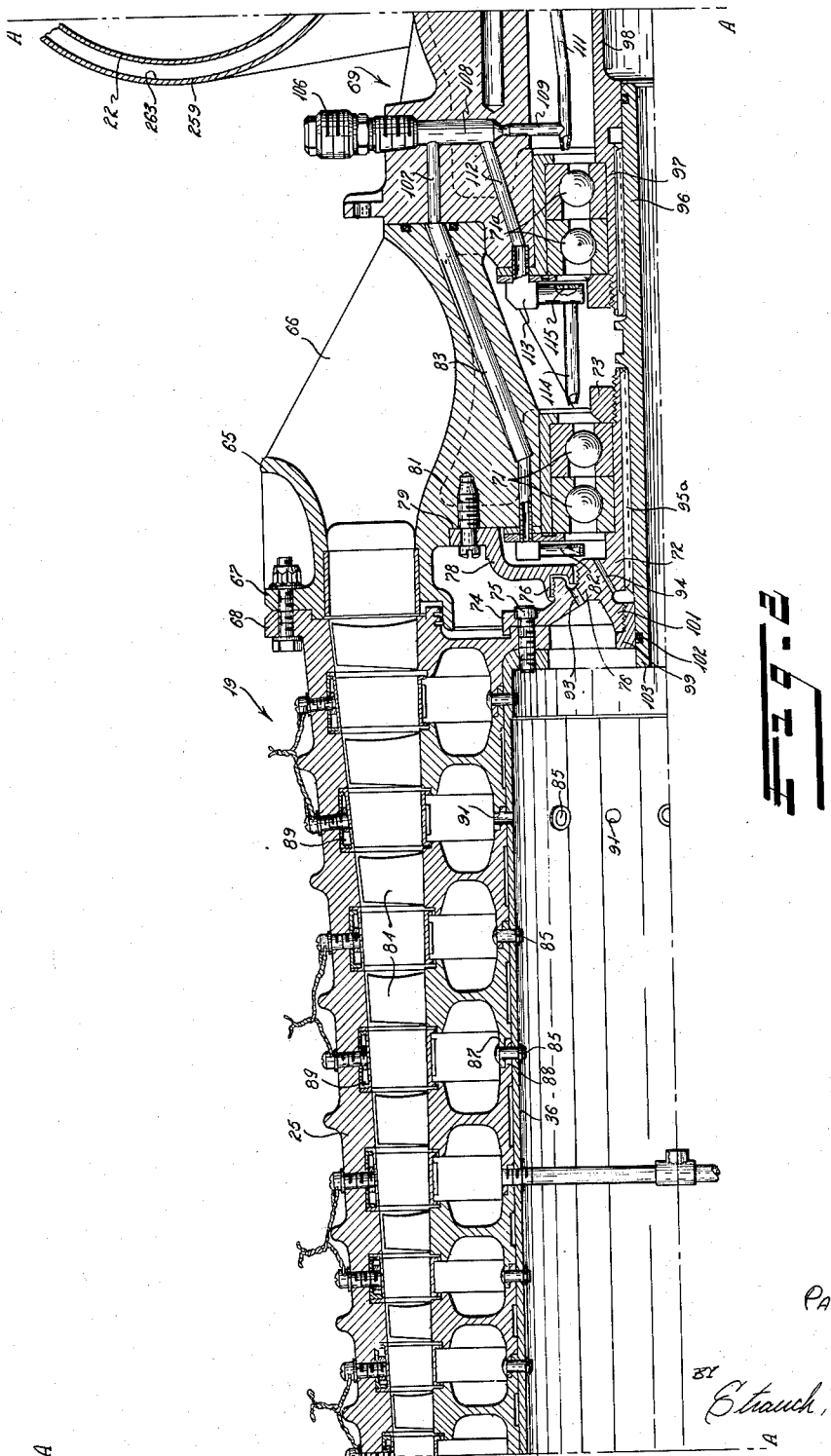

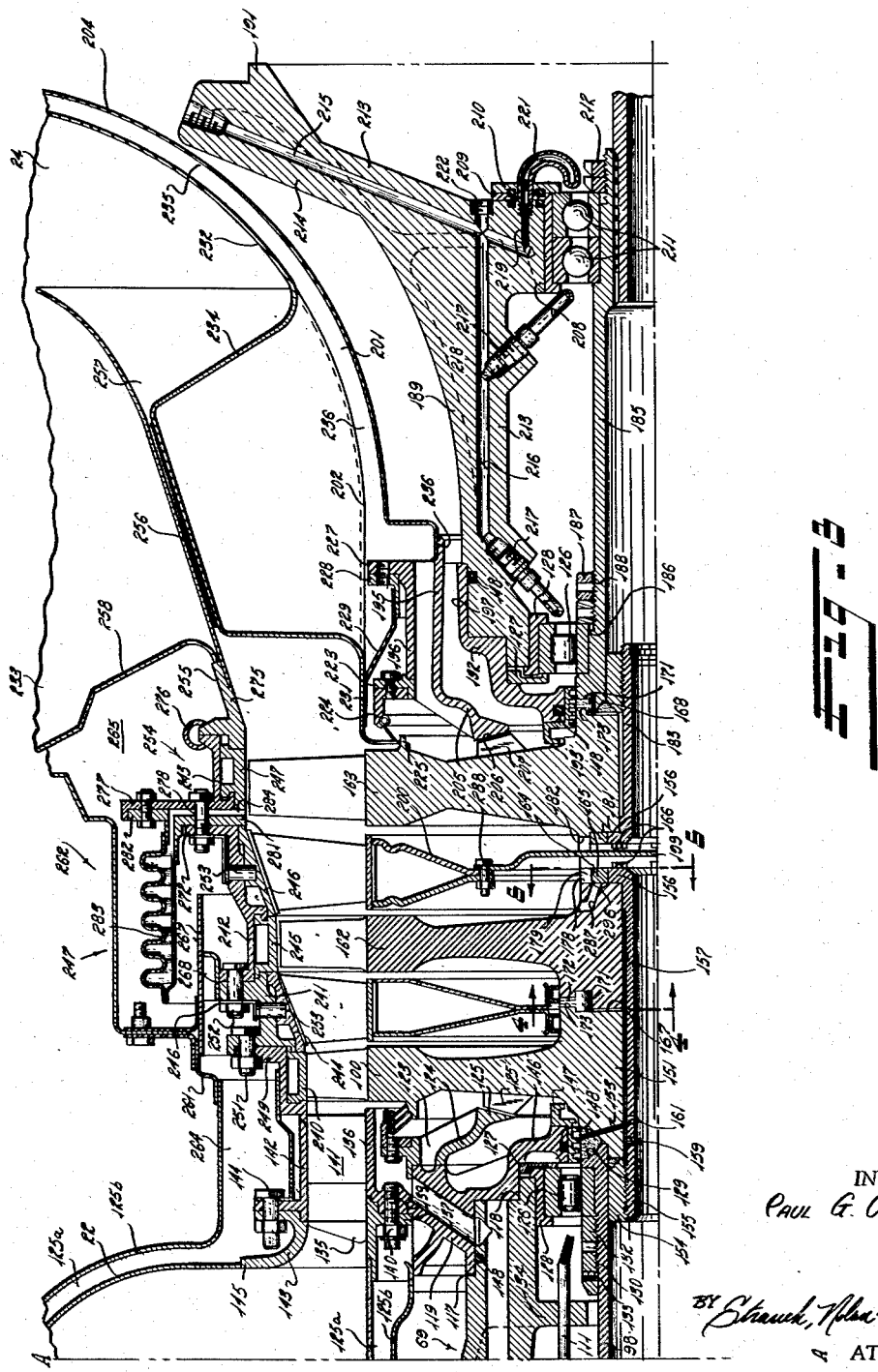

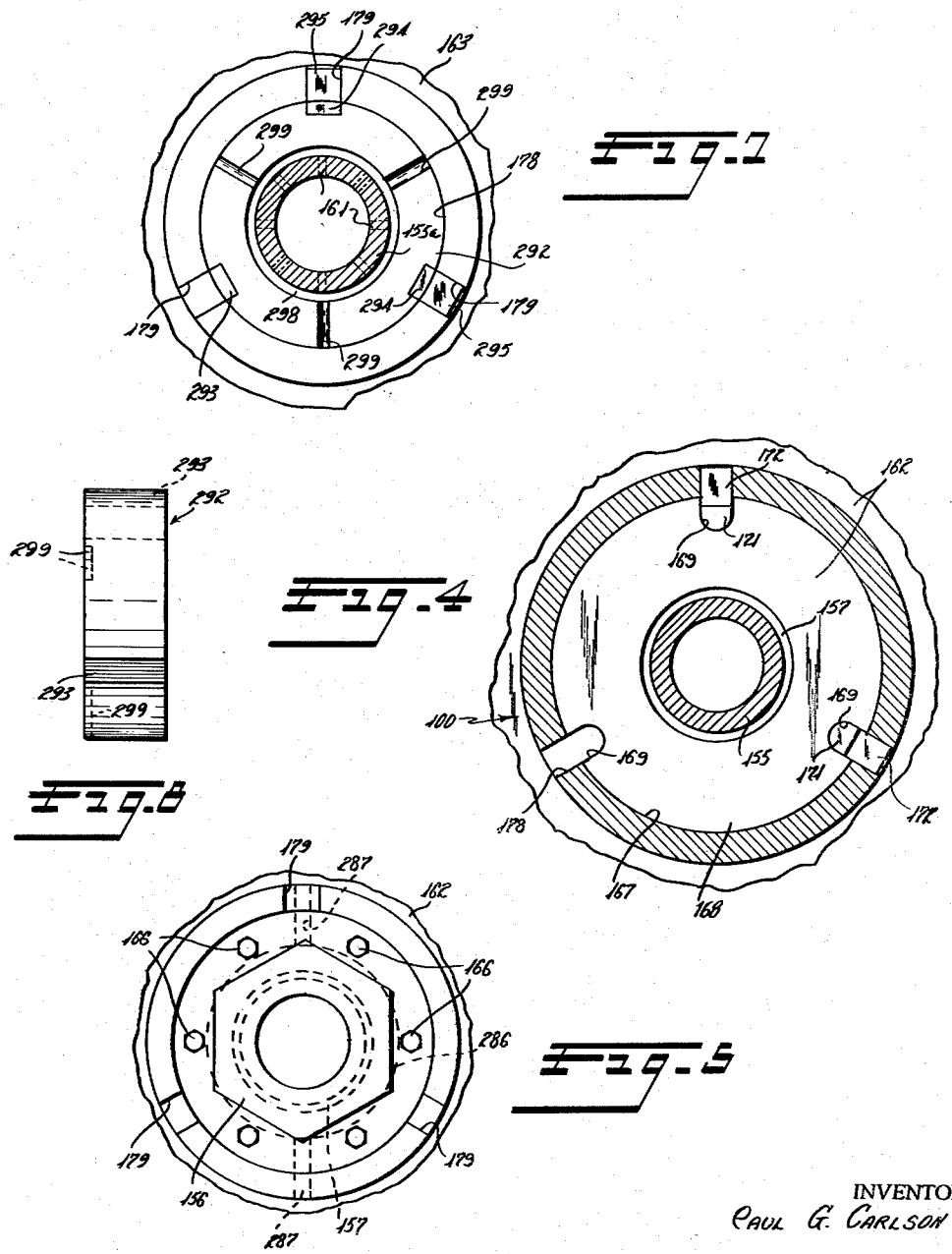

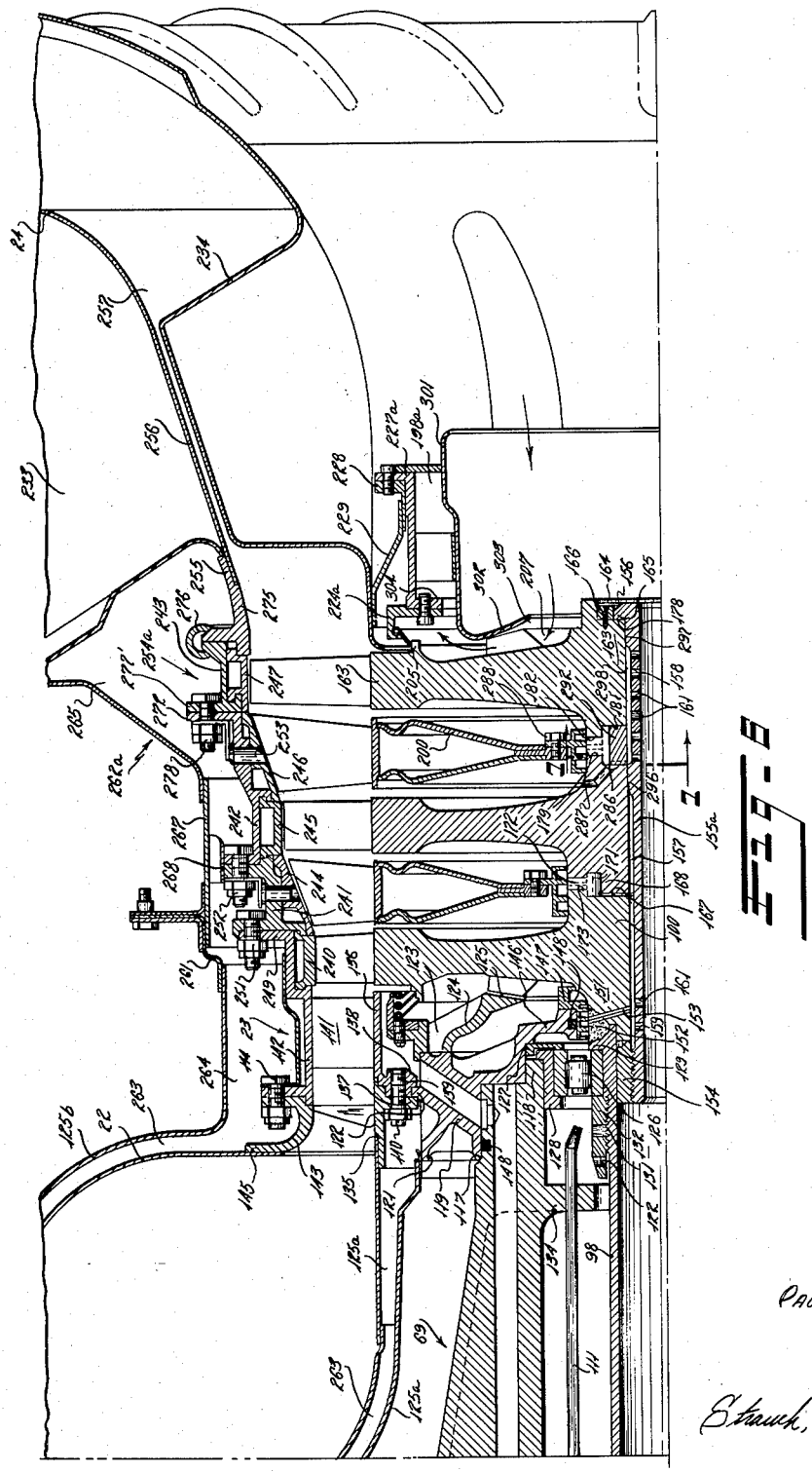

INVENTOR
PAUL G. CARLSON
BY Strauch, Nolan & Diggins
ATTORNEYS

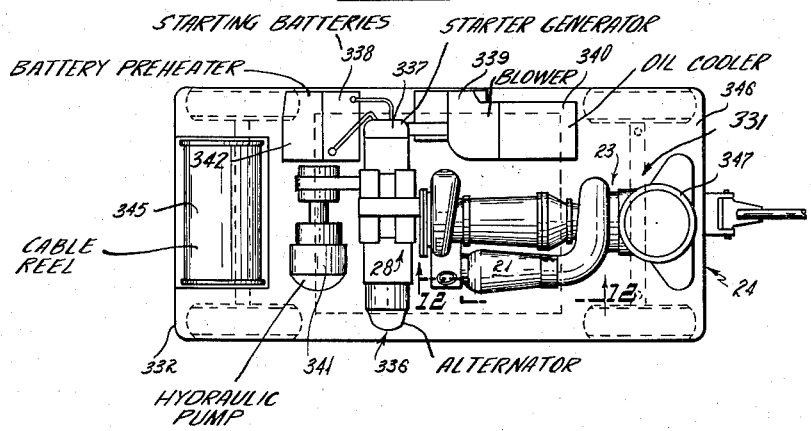

_United States Patent Office_ 2,971,334
Patented Feb. 14, 1961

2,971,334

GAS TURBINE ENGINE ADAPTABLE FOR MULTI-PURPOSE USE

Paul G. Carlson, San Diego, Calif., assignor to Solar Aircraft Company, San Diego, Calif., a corporation of California Filed Jan. 4, 1955, Ser. No. 479,727

8 Claims. (Cl. 60—39.16)

The present invention relates to compressor-turbine engines and more specifically to a multi-purpose compressor-turbine engine including interchangeable turbine parts making it possible to readily provide a power plant engineered for any one of several uses or even conversion from one engine to another with a minimum of different parts.

Compressor-turbine engines of the prior art are customarily specifically engineered for a particular use so that adaptation or conversion thereof for other uses while utilizing the same basic parts has not been practicable. As a consequence, manufacturers heretofore have found it necessary to carry on independent design and development programs and stock large numbers of differing engine parts at great cost to the manufacturer. Also customers purchasing the prior art engines have often found it necessary to purchase a second engine to meet their varying needs from time to time and stock varying replacement parts for the various engines owned by them.

It, accordingly, is a primary object of this invention to provide a compressor-turbine engine wherein the major parts will be usable in providing any one of several end use power plants and conversion of an engine provided for one use may be readily effected by a customer to provide an efficient engine for an entirely different end use with a minimum number of additional or substitute parts.

Still another object of the present invention resides in the provision of a compressor-turbine engine having a basic compressor and multiple stage turbine assembly in which a normally independently rotatable turbine stage rotor is provided with coupling means arranged and adapted to permit either ready coupling to a main independent drive shaft or ready coupling to a preceding turbine stage rotor connected to the compressor and its conventional power take-off shaft to augment the driving torque of the preceding turbine stage rotor.

Another object of the present invention resides in the provision of a compressor-turbine engine comprising a basic compressor and multiple stage turbine assembly which can by simple modification of the turbine casing and turbine rotor blade length be adapted for use as a source of high pressure air supply as well as for mechanical driving power.

A further object of the present invention resides in the provision of a novel turbine powered ground unit adapted for use in starting grounded turbojet or turboprop aircraft engines and furnishing accessory power while the grounded plane's engines are not running.

Still another object of the invention is to provide a basic compressor-turbine engine assembly with a tubular shaft connecting the compressor and the rotor of the first turbine stage and adapted to selectively receive turbine rotor securing bolts of varying length for selectively coupling one or more additional turbine stage rotors to the tubular shaft without any major alteration of the basic engine and by utilization of relatively few different or substitute parts.

Still another object of the present invention is to provide the compressor turbine engine of the preceding object with tubular turbine rotor securing bolts having apertured annular walls and conduit means for conveying air bled from between selected intermediate compressor stages inwardly to the center of the compressor and directing the bleed air axially of the compressor toward the tubular shaft and the tubular securing bolts thereby minimizing the pressure drop in the bleed air due to vortex phenomena and assuring an adequate supply of pressurized air to the bolt wall openings, the turbine rotor hub passages and the areas around the turbine rotors to cool the rotor surfaces and prevent ingress of combustion gases into said areas.

It is another object of this invention to provide a multi-stage turbine with a novel turbine rotor coupling means adapting adjacent turbine rotors for selective unitary rotation or independent relative rotation.

Still further objects will appear from the following description when read in conjunction with the appended claims and attached drawings wherein:

Figure 1 is a quarter section through the forward compressor end of the engine with the forwardly disposed gear box in quarter elevation;

Figure 2 is a quarter section through the remainder of the compressor, the compressor body extension and tubular main drive shaft illustrating a novel duct system for conveying air bled from an intermediate compressor stage to the center of the compressor drum;

Figure 3 is a quarter section through the multi-stage turbine illustrating the turbine assembly connected to provide a dual shaft variable speed engine having the basic turbine stages drivingly connected to the tubular compressor shaft and the remaining turbine stage rotor drivingly connected to a variable speed main drive shaft;

Figure 4 is a fragmental sectional view taken substantially on line 4—4 of Figure 3 looking in the direction of the arrows and illustrating the driving connection between the succeeding basic turbine stage rotors;

Figure 5 is a sectional view taken on line 5—5 of Figure 3;

Figure 6 is a quarter section through the multi-stage turbine illustrating the turbine assembly connected to provide a single shaft engine having all turbine stages conventionally drivingly connected to the tubular main drive shaft;

Figure 7 is a fragmental sectional view taken substantially on line 7—7 of Figure 6 looking in the direction of the arrows and illustrating the driving connection between the final basic turbine stage rotor and the normally independently rotatable turbine stage rotor alternately used to augment the drice of the compressor-turbine drive shaft;

Figure 8 is an elevational view of the coupling ring of Figure 7;

Figure 10 is a diagrammatic plan view of a ground power unit provided by the present invention and utilizing the engine embodiment of Figure 9 as a source of supply of compressed air and accessory power for starting the engines and powering the accessories of grounded aircraft;

Figure 9:
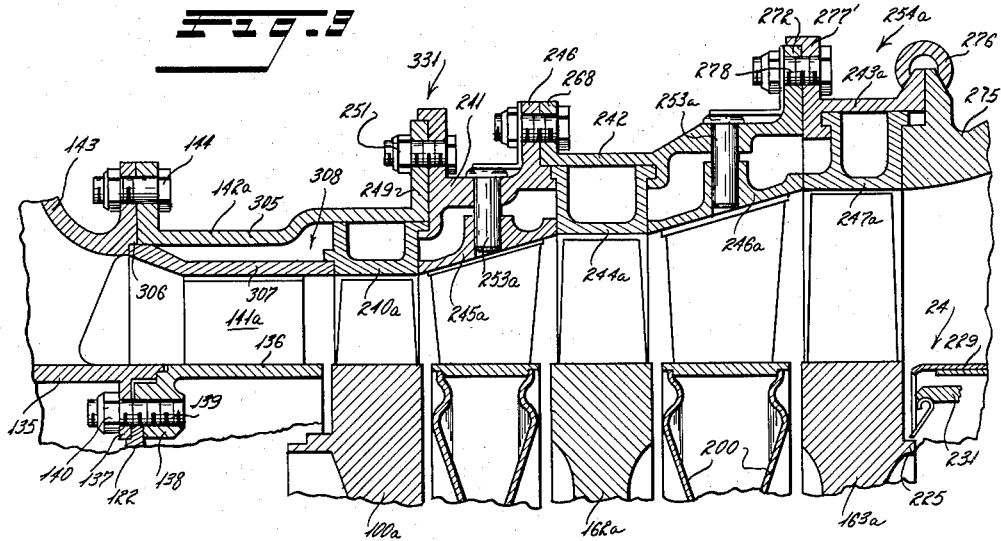
Figure 9 is a fragmental sectional view of a modification of the turbine casing and blading of the engine of Figure 6 provided to reduce the capacity of the turbine and to adapt the turbine to efficiently operate on the lower gas flow resulting from bleeding large volumes of air from the compressor outlet for use in starting the engines of grounded aircraft.
Figure 12:
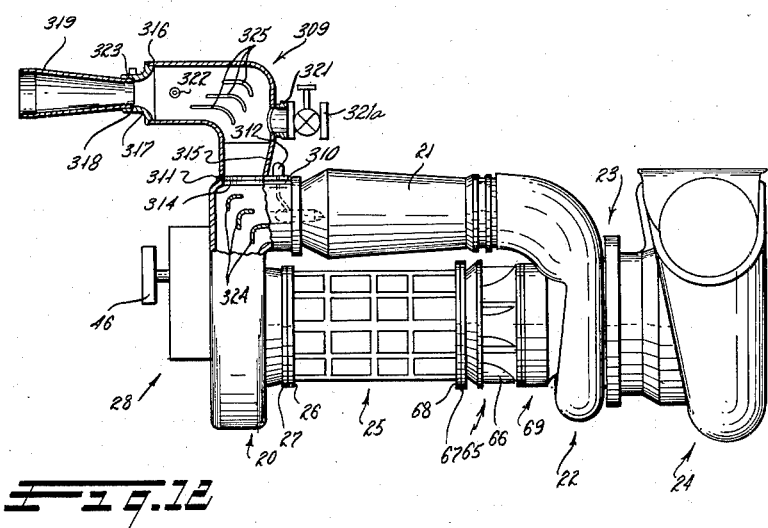

Figure 11 is a diagrammatic side elevational view of the ground power unit of Figure 10; and Figure 12 is a sectional view taken on line 12—12 of Figure 10 illustrating the flow limiting venturi mounted on the compressor scroll of the engine modification of Figure 9 for bleeding compressed air to be used for starting turbojet or turboprop engines of grounded aircraft or for other standby usage in connection with such aircraft.

With continued reference to the drawings wherein like reference numerals are used throughout the several views to indicate the same parts, the present invention is illustrated in connection with an axial flow gas turbine power plant generally similar to that disclosed in the copending application of Leon R. Wosika et al. S.N. 310,044, filed September 17, 1952 and entitled "Gas Turbine," assigned to the assignee of the present application and now Patent No. 2,801,518.

As clearly appears from a comparison of Figures 1, 2 and 3 of the present application and Figures 3, 4 and 5 of the aforesaid copending application the power plant of the present application is of the axial flow type, the several components considered fully hereinafter being arranged in axial alignment with the air entering radially into the side entry of an axial type compressor generally indicated by numeral 19 so as to flow axially to the left through the compressor to discharge through a compressor outlet scroll 20 where its flow is reversed, through smoothly curving directing vanes in the scroll casing, to flow to the right through a combustion chamber 21 (Figure 10), disposed in parallel relation to the compressor axis as shown in said copending application, then to a gas turbine inlet scroll 22 and thence axially through the several turbine stages of the turbine assembly 23 to exhaust through the turbine exhaust scroll 24. Since the arrangement of the compressor, the compressor outlet scroll, the combustion chamber, the turbine inlet scroll, turbine and turbine exhaust scroll is in all respects identical to that of the aforesaid copending application, the following description will be limited to such details as are deemed necessary to a full understanding of the present invention only.

Referring for the moment to Figure 1 of the present application, compressor scroll casing 20 is bolted at its right end to the compressor casing 25. At its left end it has a radially extending annular flange 26 bolted to the mating annular flange 27 of a gear box generally indicated by numeral 28 in a well known manner. The compressor scroll casing 20 is preferably made up of two mating sections, namely, an outer section providing an outer annular wall 31 and an inner section 32 providing an inner annular wall 33 defining a shaft chamber 34 therein. A dished casting 35 secured to the left end of the compressor rotor cylinder 36 provides a supporting hub 37 having a bearing seat for receiving the inner race of a conventional roller bearing 38 the outer race of which is mounted in a wall member 39, which closes the right end of the shaft chamber 34, through a bearing adaptor 41 in a manner that will be clear to those skilled in the art. Wall member 39 is an integral part of inner scroll casing wall 33 and the hub 37 has a splined connection 42 with a tubular shaft 43 which extends into the gear box 28 where it connects through a second splined connection 44 with a gear box input shaft 45. Shaft 45 connects through the gear box gears (not shown) to a power take-off shaft indicated generally by numeral 46. As clearly appears from Figure 1, gear box input shaft 45 is journalled in a thrust bearing 47 suitably mounted in a bore in the end wall 48 of the gear box.

The flange 27 of gear box 28 is formed at the right hand end of an annular wall 49 of the gear box which is provided with a plurality of radially directed apertures or ports 51 through which ambient air is admitted for passage along gear box end wall 48 into sheet metal duct means 52 disposed in shaft chamber 34 and dividing the chamber 34 between wall 48 and wall 39 into an axially extending air inlet passage 53 leading to bores 54 in wall 39. The air is drawn in through ports 51 by a fan 55 mounted on the casting 35 for rotation with the compressor rotor cylinder 36 and is circulated through air outlet passages 56 connected to the discharge of fan 55 through ports 57. The air in passage 56 is returned to the area surrounding scroll 20 through outlet ports 58 formed in the annular forward wall of the compressor scroll casing 20. This circulating air effectively cools gear box wall 48, bearings 38 and 45, and inner wall 33 of scroll 20 in passing through the bores and passages just described, it being understood that bores 54 and 57 have relatively large effective areas and leave just enough wall material to adequately carry the bearing load.

In spite of the fact that the air entering the scroll 20 from the compressor has a temperature of around 500° F., the cooling air passing through shaft chamber 34 maintains the shaft chamber at a reasonable working temperature to decrease wear and maintenance of the shaft and its bearings.

Labyrinth seals 59 formed between wall 39 and the opposed portions of dished casting 35 effectively seal the the fan 55 from bearing 38 in a manner to be hereinafter pointed out. Lubricant is supplied to bearings 38 and 47 from a pump located in gear box 58 functioning as more fully described in the aforesaid Patent 2,801,518, a branch pipe 61 suitably supported in chamber 34 being provided to convey lubricant axially of the chamber to bearing 38.

Referring for the moment to Figures 1 and 2, the compressor assembly 19 in addition to casing 25 and rotor cylinder 36 comprises an annular machined casting 65 defining an air intake scoop 66 sealingly connected through an annular flange 67 to a mating flange 68 formed at the right hand end of compressor casing 25. If desired, the power plant of the present invention may be provided with an air silencer and oil cooler cooperating with intake scoop 66 as more fully disclosed in the aforesaid copending application.

The opposite end of casting 65 is suitably secured to annular casting 69 forming an extension of compressor casing 25 and more fully described hereinafter. Casting 65 has a bore therein coaxially disposed with respect to bearing 38 and providing a bearing seat for supporting a pair of side-by-side related roller bearings 71. Bearings 71 journal a dished casting 72 having an axially extending tubular hub threaded externally at its outer end to receive a clamp nut 73 for securing bearings 71 to casting 72. The opposite end of casting 72 has a radially outwardly extending flange 74 suitably apertured at annularly spaced points to receive cap screws 75 for securing casting 72 to the right hand end of a compressor cylinder 36. Since cylinder 36 carries the compressor rotor blading, it will be appreciated that bearings 71 journal the right end of the compressor rotor structure in casting 72 which rigidly supports compressor casing 25 through casting 65.

Suitable labyrinth seals 76 formed on radially spaced annular surfaces of casting 72 cooperate with the adjacent surfaces of a detachable cap member 78 secured in an annular recess of radial wall 79 formed in casting 65 by means of cap screws 81 to form a seal between wall 79 and the compressor rotor structure. A suitable lubricant fitting 82 is supported in the annular chamber formed within member 78 for conveying lubricant from lubricant passage 83 to bearings 71 in a manner apparent to those skilled in the art.

As most clearly appears from Figures 1 and 2, compressor assembly 19 of the disclosed embodiments of the invention provides a ten stage compressor the rotors 84 of which are suitably secured to rotor cylinder 36 by means of rivets 85 passing through suitable rivet holes formed in cylinder 36 and the mating flanges 87 and 88 forming the hubs of the compressor rotor wheels. The stator blading 89 of the compressor is supported by casing 25 and may be of any desired construction. The stator blading however preferably takes the form of that disclosed in United States Letters Patent 2,681,788 to Leon R. Wosika, issued June 22, 1954. It will be appreciated, however, that a compressor composed of a lesser number of compressor stages and of any other suitable construction might be employed without departing from the spirit of the present invention.

As clearly appears from Figure 2, certain of the rivets 85 in the line of rivets between the second and third stage rotors are omitted thereby providing bleed passages 91 at annularly spaced intervals around rotor cylinder 36. These passages bleed off pressurized air to the interior of cylinder 36 for the purpose of supplying pressurized air to the labyrinth seals 59 and 76 through air passages 92 and 93 respectively provided in the castings 35 and 72, and to cool the second stage turbine in a manner to be described.

Lubricant from bearings 38 is permitted to pass through inclined passages 94 into the interior of casting 35 to lubricate the splined connection 42. Closure cap 95 threaded into the internally tapped annular boss on casting 35 prevents escape of this lubricant to the interior of the rotor cylinder 36.

Hub 72 is similarly provided with an inclined passageway 93 for directing lubricant from the area of bearings 71 to the splined connection 95a formed between the internal splines provided on member 72 and external splines formed on main tubular drive shaft 96 provided for drivingly connecting the compressor rotor cylinder to the splined end 97 of tubular turbine rotor shaft 98 the opposite end of which is suitably welded to the hub of rotor 100 of the first turbine stage. A suitable externally threaded closure plug 99 threaded into an internally tapped annular flange 101 of casting 72 and cooperating with an O-ring seal 102 carried in a ring groove in the plain annular terminal end 103 of shaft 96 prevents leakage of oil from the region of splined connection 95a to the interior of rotor cylinder 36.

The splined end 97 of shaft 98 is provided with an external bearing seat adapted to receive a pair of side-by-side related roller bearings 71 and 71a held in place thereon by means of a clamp nut 105 threaded on the externally threaded portion of shaft end 97 and carried in a bearing seat formed in the end wall of annular extension casting 69. As clearly seen from Figure 2, extension casting 69 is apertured to receive a lubricant fitting 106 and contains a lubricant passage 107 leading to the outer end of lubricant passage 83 and a radially extending lubricant passage 108 the inner end of which receives a lubricant branch pipe 109 leading into an axially extending lubricant branch pipe 111 adapted to supply lubricant to the inner bearing 71 on the end 97 of shaft 98. Lubricant passage 108 adjacent its end is intercepted by a sloping lubricant passage 112 the inner end of which receives a lubricant fitting 113 having a branch pipe 114 for supplying lubricant to inner bearing 71 mounted in casting 65. Fitting 113 also has a lubricant port 115 for supplying lubricant to the outer bearing 71 carried on shaft 98.

The opposite end of casting 69 is provided with an annular surface 117 of reduced diameter and a still smaller reduced diameter annular terminal end 118. These annular surfaces matingly engage the stepped bore of a turbine support hub or casting 119 providing at the end facing toward casting 69 an annular radially outwardly spaced support flange 121. Hub 119 axially spaced from flange 121 is provided with an annular, radially outwardly protruding support and clamp flange 122 and beyond flange 122 terminates in a right angularly disposed peripheral end wall section defining a peripheral support surface for receiving a chamber defining end cap 123. Cap 123 has an inwardly extending dish shaped wall 124 terminating in an inclined annular face 125 defining an annular bore of substantially greater diameter than the hub of the first stage turbine rotor 100 and the end face of a fan chamber containing fan blades 125' formed on the upstream face of rotor 100. Fan blades 125' draw air from the ambient atmosphere and expel it into the air chamber formed between the rotor 100 and end cap 123 which is in turn connected to the air duct 125a formed between the wall of turbine scroll 22 and its surrounding shroud 125b to cool rotor 100. Hub 119 has an inwardly directed end wall defining with the end of casting 69 an annular chamber for receiving a roller bearing 126 the outer race of which is fixed with respect to casting 69 and hub 119 by bearing retainer rings 127 and 128. The inner race of bearing 126 is received in a bearing seat formed on the rear end of tubular turbine shaft 98 between a radially outwardly extending shoulder 129 and a threaded section 130 adapted to receive a clamp nut 132 secured against retrograde movement by a set screw 133. As clearly appears from Figure 3, the inner bearing race of bearing 126 is formed to permit relative axial sliding movement with respect to the bearing roller. Therefore, bearing 126, while providing radial support between casting 69 and tubular shaft 98, allows axial thermal expansion of the turbine end of shaft 98 without binding of the bearing. Lubrication of bearing 126 is affected by extending branch pipe 111 through radially inwardly directed flange 134 formed on casting 69 so that the end of pipe 111 will be positioned to direct lubricant into the bearing.

The turbine support hub 119 through flange 122 mounts the sectional turbine casing assembly the inner ring shaped portions 135 and 136 of which have radially inwardly directed clamp flanges 137 and 138 matingly cooperating to receive flange 122 therebetween. Suitable studs 139 carried by flange 138 and freely passing through flange 137 threadedly receive clamp nuts 140 which draw flanges 137 and 138 into clamping engagement with flange 122. Ring shaped element 136 mounts the inner end of inlet stator vanes 141 the outer ends of which are secured to outer casing ring 142. Ring 142 is in turn connected to outer casing ring 143 through mating flanges secured in abutting engagement by means of suitable nut and bolt assemblies 144. The free end of ring element 135 as clearly seen in Figure 3 is formed to provide axially extending annular wall section which cooperates with radially outwardly directed wall section 145 of outer casing ring 143 to carry the main body section of the turbine scroll 22 in well known manner.

The radially inwardly directed end wall 146 of hub 119 terminates in an enlarged annular bore carrying a seal ring 147 cooperating with the hub of rotor 100 to form a labyrinth seal. An O-ring seal 148 carried in the bore of wall 146 cooperates with labyrinth seal ring 147 to seal the bore of wall 146 against axial leakage of grease and pressurized air while a similar O-ring seal 148 in annular surface 117 of casting 69 prevents leakage between surface 117 and the mating surface of support casting 119. Hub 151 of rotor 100 is provided with a sloping passage 153 adapted to supply pressurized air to labyrinth seal 147 in a manner to be now pointed out.

The turbine end of tubular shaft 98 is provided with an internally threaded annulus 154 suitably welded to shaft 98. Annulus 154 is adapted to receive the threaded terminal end of a tubular turbine rotor assembly bolt 155 the opposite end of which is formed with a wrench head 156 disposed in overlapping abutting engagement with the end face of the rotor of a selected succeeding turbine stage. As shown in Figure 3, rotor assembly bolt 155 is annularly recessed at 157 to provide an axially extending annular air chamber communicating with the interior of the assembly bolt 155 through suitable radial ports 159 and 161 for supplying pressurized air through chamber 157 to rotor passage 153 and the labyrinth seal formed by ring 147.

In Figure 3 turbine assembly 23 is disclosed as a three stage turbine made up of rotors 100 and 162 respectively coupled one to the other to assure unitary rotation and held against relative axial movement by engagement of head 156 of assembly bolt 155 with the radial face of recess 164 formed in the exposed end face of rotor 162. A locking retainer ring 165 disposed in recess 164 and secured therein by bolts 166 locks bolt 155 against accidental loosening. Rotors 100 and 162 coupled as heretofore described constitute the basic engine assembly of the embodiments of the invention disclosed in this application and they are coupled for unitary rotation by suitable interfitting hub formations and driving keys which will now be described.

Referring for the moment to Figures 3 and 4, it will be seen that the opposed faces of the hubs of the rotors 100 and 162 are respectively provided with an annular recess 167 and an interfitting, axially extending, reduced diameter, annular boss 168. Boss 168 at angularly spaced intervals, as indicated in Figure 4, is provided with peripherally opening, round bottomed notches or key receiving seats 169 adapted to receive the base portions of generally L-shaped driving keys 171 the stems 172 of which extend radially outwardly through end opening keyways or notches 173 formed in the radially outwardly disposed annular flange defining recess 167 of the hub of rotor 100. As clearly seen in Figure 3, notches 173 do not extend the full depth of recess 167 with the result that the axially protruding portions of keys 171 interfit behind the segments of the flanges left at the inner ends of notches 173 to retain keys 171 against radial disassociation under influence of centrifugal forces developed during rotation of rotors 100 and 162. Since assembly bolt 155 secures rotors 100 and 162 against relative axial movement, it will be appreciated that this key and keyway construction provides a simple yet effective driving connection between rotors 100 and 162.

It will also be appreciated that while the disclosed embodiments of this invention depict the basic compressor turbine assembly having two turbine stages, a greater or lesser number of turbine stages could, if desired, be readily provided by coupling additional turbine rotors to rotor 162 in the manner just disclosed or utilizing the initial stage turbine rotor only and adapting it for selective coupling to the rotor of the convertible turbine stage as will be hereinafter described.

Referring for the moment to Figures 3 and 6, the annular recess 164 of turbine rotor 162 of the basic engine assembly is defined by a radially outwardly disposed axially extending flange having annularly spaced keyways or notches 179 extending radially through the annular flange and opening out of its end face. The opposing hub face of turbine rotor 163 is provided with a similar recess 181 and flange construction having annularly spaced keyways or notches 182 formed therein in opposed relation to the keyways 179 of rotor 162. The recesses 164 and 181 of rotors 162 and 163 in the engine of Figure 3 form respective chambers for receiving the wrench heads 156 of securing bolt 155 and a securing bolt 183 threadedly engaged in an internally threaded annulus 184 welded in the inner end of variable speed power take-off shaft 185.

Variable speed power take-off shaft 185 and the opposing face of the hub of independently rotatable rotor 163 are respectively formed with an annular flange 173 and interfitting boss 168 similar to the corresponding parts of rotors 100 and 162 drivingly connected by similar keys 171. The inner end of shaft 185 is provided with a bearing seat 186 for receiving the inner race of a roller bearing 126, similar to the previously described roller bearing 126, clamped in place on seat 186 by a clamp nut 187 threadedly engaged with an externally threaded section 188 of shaft 185. The outer race of bearing 126 is mounted in bearing retainer rings 127 and 128 in all respects similar to bearing retainer rings 127 and 128 heretofore described. Bearing retainer ring 128 is in turn mounted in an annular bore provided in the inner end of a support casting 189 adapted at 191 to be matingly supported in the end of a gear reduction box (not shown) having an output shaft for transmitting a variable speed drive to the propeller of a marine vehicle or other driven mechanism. The inner end of support casting 189, as clearly shown in Figure 3, receives a cap structure 192 having an annular bore adapted to receive a labyrinth seal ring 193 which cooperates with the adjacent hub portion of rotor 163 and the opposed annular portion of shaft 185 to form a labyrinth seal in well known manner. A suitable O-ring seal 148, like that provided between bearing seal ring 147 and the bore of wall 146 of support casting 119, is interposed between seal ring 193 and the bore of cap casting 192 to seal these members against leakage.

Cap casting 192, as clearly seen from Figure 3, is provided with annularly spaced radially directed ribs 194 carrying radially spaced annular ring like walls 195 and 196 defining annular air passages 197 and 198 adapted to respectively introduce air from the ambient atmosphere (see arrows) into the area surrounding the downstream face of rotor 163 and to convey the air away from the downstream face of rotor 163 into passage 201 formed between the wall 202 of turbine exhaust scroll 24 and suitable sheet metal shrouding member 204. As seen in Figure 3 annular wall element 196 supports a dish shaped end cap 205 the dished wall of which, like wall 124 of end cap 123, terminates in an inclined annular face 206. End cap 205 cooperates with the opposed face of rotor 163 to define a fan chamber containing fan blades 207 carried by the downstream face of turbine rotor 163. Air circulated by fan blades 207 scours the downstream face of rotor 163 to cool it and is expelled through passage 198 into the passage 201 in a manner that will be clear to those skilled in the art. Pressurized air from the end of securing bolt 155 is directed radially outwardly over the face of rotor 162 to cool it and pressurize the space therearound by closure cap 199 disposed between the hubs of rotors 162 and 163 and carried by the support ring 200 of the third stage stator structure to be described.

Casting 189 at its opposite end is provided with an annular bore 208 adapted to receive a bearing retainer ring 209 cooperating with retainer ring 210 to receive a double row ball bearing 211 for supporting the other end of shaft 185 in casting 189. A suitable clamp nut and lock nut assembly 212 clamp the inner races of bearings 211 to shaft 185.

Casting 189 is provided with internal ribs 213 and an external boss 214 providing intersecting lubricant passages 215 and 216. The end of passage 216 adjacent bearing 126 is provided with a suitable lubricant fitting 217 for injecting lubricant into bearing 126 while the intermediate portion of passage 216 is suitably intersected by a passage 218 tapped to receive a further fitting 217 for injecting lubricant into the inner roller bearing 211. The inner end of passage 215 is in turn intersected by the cross passage 219 into which is tapped a U-shaped lubricant fitting 221 arranged to inject lubricant into the outer bearing of roller bearing set 211. A suitable plug 222 closes the outer end of lubricant passage 216 in well known manner. To assure a fluid tight connection between casting 189 and casting 197, a suitable O-ring 148 carried by an annular groove in casting 189 is provided.

End cap 205 is provided with an annular radially outwardly disposed flange 223 adapted to support an annular seal ring assembly 224 cooperating with annular flange 225 on the end face of rotor 163 to sealingly close the outer end of the fan chamber provided for fan blades 207. Since the air in this fan chamber is under considerable pressure due to the nearby fan blades, the air serves to prevent the flow of exhaust gases inwardly along the face of rotor 163 in well known manner.

At its end remote from flange 223, casting 192 is provided with an annular flange 227 adapted to support a mounting ring 228 carrying a sheet metal support ring 229 having an outwardly inclined central portion terminating in a radial flange 231 resiliently supporting the inner wall 232 of exhaust scroll 24. Wall 232 at annularly spaced intervals adjacent turbine rotor 163 is provided with inwardly directed depressions 234 forming strengthening webs to impart rigidity to scroll wall 232. Wall 232 as previously pointed out is surrounded by shrouding 204 which is supported by an axially extending flange 236 formed on the annular wall 195 of casting 192. This shrouding isolates the casting 189 from the direct radiated heat from the exhaust scroll to maintain casting 189, bearings 126 and shaft 185 at suitable operating temperatures.

As heretofore pointed out, the turbine casing is of sectional construction. The initial section comprises the outer casing ring member 142, ring portions 135 and 136 and liner ring segments 240. The succeeding sections are made up of outer casing rings 241, 242 and 243 respectively provided with stator blade assembly 244, liner segments 245 and stator blade assembly 246 and liner segments 247 in well known manner. These liner segments and stator blade assemblies define the annular gas passages for conveying the combustion gases past the first, second and third stage rotors 100, 162 and 163 in customary manner. While any suitable form of stator assembly may be employed, the present invention preferably contemplates stator assemblies made in accord with United States Letters Patent 2,681,788, issued on June 22, 1954, to Leon R. Wosika.

As clearly seen from Figure 3, casing element 241 is secured to and supported by radial flange 249 of ring element 142 through suitable bolt and nut assemblies 251. Casing rings 241 and 242 are similarly connected through mating radial flanges maintained in abutting engagement by bolt and nut assemblies 252. Suitable positioning pins 253 extending through peripherally disposed apertures in rings 241 and 242 and held in place by L-shaped retainer clips 254 carried by bolt and nut assemblies 252 secure stator assembly 244 against relative rotational movement with respect to ring 241.

While the turbine casing structures in the forms of invention disclosed in Figures 6 and 8 are generally the same as will be hereinafter pointed out, the casing in the embodiment of the invention shown in Figure 3 differs to the extent that casing rings 242 and 243 are interconnected by a suitable expansion joint 247 to accommodate the relative movement incident to the independent mounting of rotor 163 and exhaust scroll 24 on casting 189.

In all forms of the invention, the third or separable stage rotor 163 is housed by a terminal turbine casing section 254 terminating in annular, generally axially and outwardly extending support flange 255 internally recessed to receive the inner reduced diameter end of a deflector cone 256 forming the outer annular wall of an exhaust passage 257 of progressively increasing diameter in a downstream direction. Exhaust passage 257 directs the exhaust gases from the final turbine stage to the interior of the exhaust collector 24 as more fully described in the aforesaid Patent No. 2,801,518. Flange 255 also forms a support for the other wall 258 of the exhaust scroll. The turbine inlet scroll, the turbine casing and the exhaust collector are provided with sheet metal shrouding members 125b, 261 and 262 providing air circulation passages 125a, 264 and 265 for shielding the inlet scroll, turbine casing and exhaust scroll from the ambient atmosphere and providing a flow of air therethrough and into the exhaust scroll under influence of the aspiration effect of the dispelled exhaust gases as clearly disclosed in the aforesaid Patent No. 2,801,518.

While the specific shapes of the terminal casing sections 254 and their specific structure varies in the embodiments of the inventions disclosed in Figures 3 and 6 as does the particular shape of the shrouding section 262, it will be noted that the shrouding structure in all forms of the invention embodies a support section 267 of generally annular configuration having annularly spaced sheet metal support elements 268 located substantially mid-way of its length and disposed to rest upon the mating flanges of turbine casing sections 241 and 242. This support section maintains the shrouding in fixed relative radially spaced relation to the turbine casing.

From the preceding description it will, therefore, be appreciated that conversion of the engine disclosed by Figures 1, 2 and 3 to either one of the engines of Figure 6 or 9 will require the substitution of a minimum number of turbine and shrouding elements. For example, either such conversion contemplates elimination of expansion joint 247, substitution of casing section 254a for section 254 and shrouding section 262a for section 262. Referring for the moment to Figures 3, 6 and 9, it will be appreciated that the intermediate stage ring section in all three engines has a radial flange 272 and the terminal sections 254 and 254a are each made up of similar outer ring sections 243 and 243a and identical mating ring sections 275 connected by an annular C-shaped clamp ring 276. In the engines of Figures 3 and 6, ring sections 243 or 243a cooperate with ring 275 to support between them an identical turbine rotor segment ring 247 while the engine of Figure 9 employs a similar segment ring 247a differing only in radial depth from ring 247. It will also be appreciated that the only difference between ring section 243 of Figure 3 and the corresponding ring sections 243a of Figures 6 and 9 resides in the fact that the radial flange 277 of the Figure 3 engine is of greater radial length than the corresponding flange 277' of Figures 6 and 9. In all three engines suitable bolt and nut assemblies 278 are provided to secure flange 272 to the adjacent flange of terminal casing section 254. In the embodiment of Figure 3, the annular support rings 281 and 282 carried by the opposite ends of expansible bellows element 283 of expansion joint 247 are interposed between flanges 272 and 277 to form a radially extending annular passage 284 connecting the interior of the turbine casing to the expansible bellows. This interposed expansion joint permits relative movement between the independently supported turbine casing sections 242 and 254 as a result of the independent mounting of rotor 163 and its connected shaft and casing elements in this form of the invention.

Completion of the conversion from the two-shaft engine of Figure 3 to the single shaft engine of Figure 6 entails removal of casting 189 and its associated shaft 185 from rotor 163 and connection of rotors 162 and 163. This can be readily accomplished by removing shrouding section 262 formed in two halves and clamp ring 276 and withdrawing casing section 275, exhaust scroll 24, casting 189 and rotor 163 axially as a unit from the casing section 243. This exposes the third stage stator assembly 246 and its support ring 200 and end cover plate 199 for ready removal by disassembly of nut and bolt assemblies 288. After removal of cover plate 199, labyrinth seal ring 291 (Figure 6) is secured to the support ring 200 by nut and bolt assemblies 288. Lock ring 165 and rotor securing bolt 155 are then removed and coupling ring 292 (Figures 7 and 6) having peripherally disposed annularly spaced key seats 293 fitted with T-shaped keys 294 is inserted into end recess 164 in the hub of rotor 162 with the forward half of stems 295 of the keys 294 extending radially outwardly through notches 179 of the annular flange formed on the face of rotor 162. Rotor 163 is then assembled on the coupling ring 292, the rotor recess 181 matingly receiving the ring 292 and the flange notches 179 receiving the other half of the stems 295 of keys 294. A rotor securing bolt 155a similar to but longer than securing bolt 155 is then inserted through the rotor bores and threaded home in annulus 154 to clamp rotors 100, 162 and 163 with the removable coupling ring 292 and its keys 294 in unitary assembled relation for rotating main turbine drive shaft 98. Lock ring 166 is then placed in recess 164 formed in the opposite hub end of rotor 163 to lock securing bolt 155a in assembled relation. As clearly seen from Figure 6, securing bolt 155a is provided with spaced lands 296 and 297 defining between them annular chamber 298 similar to chamber 157 defined between land 296 and the threaded end of the securing bolt and corresponding to chamber 157 of securing bolt 155. Chamber 298 supplies pressurized air to annular passage 286 and intersecting annularly spaced passages 287 of the second stage rotor which are connected to chamber 298 through annularly spaced passages 299 formed in the forward face of coupling ring 292. Pressurized air supplied as just described takes the place of the air supplied through the end securing bolt 155 in the Figure 3 engine.

The downstream or exposed face of rotor 163 opposes a cooling air adapter assembly in the form of an open ended cylinder 301 having a sloping wall 302 generally paralleling the face of the body of rotor 163 opposite fan rotor blades 207 to define an air passage 303 leading to annular passage 198a corresponding to passage 198 of the previously described form of the invention. Cylinder 301 is supported from mounting ring 228 by means of a casting 227a generally similar to casting 227 of the previous embodiment of the invention but having an annular inwardly directed flange 304 adapted to receive a sealing ring 224a similar to previously described sealing ring 224. Sealing ring 224a like ring 224 cooperates with annular flange 205 to seal off passage 303 from the exhaust passage of the turbine.

It will be appreciated from viewing Figure 6 that the turbine scroll 24 of this form of the invention is identical to that of the engine of Figure 3 and is secured to turbine casing section 254 by C-shaped clamp ring 276 cooperating with the radially outwardly extending annular flange formed on casing section 243a and terminal casing section 275. It will also be appreciated that turbine shrouding 204 is omitted in the engine of Figure 6 and that the turbine shroud section 262a is suitably formed to closely encircle the turbine casing in the form of the invention of Figure 6 since the expansion joint 247 is omitted in this form of engine.

Operation of the engine of Figure 6 is effected in a manner clear to those skilled in the art, the combustion gas passing through the three turbine rotors in succession being effective to drive the rotors as a unit and apply the combined power of the three turbine rotors to shaft 98.

As previously pointed out, the present invention also makes it possible to readily provide a turbine engine capable of use to simultaneously provide mechanical torque and a supply of compressed air. Such an engine is admirably adapted for use as the power unit of a ground power cart adapted for use as a power plant and starter unit for grounded aircraft, particularly turbojet or turboprop aircraft, and is illustrated in Figures 9 through 12 of the drawings. This engine makes use of the same turbine and shrouding parts as the engine of Figure 6 with the exception that the several turbine rotors 100, 162 and 163, casing element 142, linear segments 240, 244, 247 and stator assemblies 245 and 246 are replaced by similar elements. In this form of engine, casing ring 142 is replaced by a ring 142a having a minimum internal diameter at 305 equal to that of the shoulder 306 of casing ring 143 and omitting the annular axially extending flange provided in the Figure 3 and 6 engines for cooperation with the first stage rotor segments 243. In place of this latter shoulder, the engine embodiment of Figure 9 provides a linear element 307 forming a substantially smaller diameter outer ring of a guide vane assembly composed of ring 136 and foreshortened guide vanes 141a similar to vanes 141 of the previous described engine embodiments. The downstream end of liner element 307 is adapted to matingly receive ring segments 240a similar to ring segments 240 of the engine embodiments of Figures 3 and 6 but of greater radial depth. Flange 249 of casing element 142a together with the annular peripheral flange formed on ring segments 240a mate with casing ring 241 in the same way that casing ring 142 and liner segments 240 of the previously described engines do. The successive casing sections 242 and 243a are identical to the sections 242 and 243a of the engine embodiment of Figure 6. Stator ring assemblies 245a and 246a and rotor ring segments 244a, and 247a are similar to corresponding elements 245, 246, 244 and 247 but are of greater depth outwardly of the vanes to provide a passage section of a substantially lesser radial dimension. They are suitably mounted in casing sections 241, 242 and 243a to define a continuous annular working gas passage 316 of substantially lesser cross sectional area than the corresponding working gas passage of the engine embodiments of Figures 3 and 6. To secure stator assemblies 245a and 246a against rotation pins 253a similar to pins 253 but having longer shanks are provided in this form of engine embodiment.

In lieu of the conventionally proportioned rotors 100, 162 and 163 of the Figure 3 and 6 engines, the engine embodiment of Figure 9 is provided with rotors 100a 162a and 163a identical in construction to rotors 100, 162, and 163, except for the use of shorter length blades. This reduction in cross sectional area of the working gas passage 308 by use of deeper inner casing rings and foreshortening of the rotor blades enables retention of the same blade angles in all forms of the engine and minimizes tooling and engineering costs. At the same time, the engine embodiment of Figure 9 effectively accommodates the substantial amount of compressed air bled from the compressor outlet scroll 20 through a suitable flow limiting venturi member 309 disposed in the outlet connection of the compressor scroll, as more clearly shown in Figure 12 of the drawing, with little or no change in engine efficiency, little additional development and a decrease in rotational stress through shorter blades. This reduction in rotational stress is accompanied by a longer rotor life at the rated speed of the other engine embodiments with the same safety margin at even higher operating speeds.

While flow limiting venturi 309 may take any suitable form and be connected into the compressor outlet ducting at any desired point, the present invention preferably contemplates a structure and connection as shown in Figure 12. As there shown, the flow limiting venturi 309 is mounted on the outlet elbow 310 of compressor scroll 20 by means of a mounting plate 311 bolted to the wall of elbow 310 in any suitable manner (not shown). Plate 311 also preferably carries the fuel inlet nozzle assembly 312 for supplying fuel to combustion chamber 21 the opposite ends of which are connected to compressor scroll 20 and turbine inlet scroll 22 in any conventional manner. Communication between the interior of elbow 310 and flow limiting venturi 309 is provided by opening 314 formed in the wall of elbow 310.

As clearly appears from Figure 12, flow limiting venturi 309 comprises an elbow like duct suction having a tapered inlet portion 315 welded to or otherwise suitably secured to plate 311 and a right angularly disposed outlet portion 316. Outlet portion 316 terminates in a squared end adapted to receive a reducer element 317 providing a throat section 318 and supporting a divergent tubular conduit 319 the free end of which connects with a solenoid operated manual control valve indicated by numeral 320 in Figure 11. Valve 320 is under control of the ground cart operating crew and is actuated only after the air supply connection is made to the aircraft and the pilot is ready to utilize the air output for either engine starting purposes or to supply flight deck air conditioning for his grounded plane.

A flanged outlet 321 is provided adjacent the inlet end of flow limiting venturi 309. This outlet is normally closed off by a suitable manually controlled valve 321a operable only when surge conditions develop during the starting cycle of the turbine engine 331 of Figure 9 and it becomes desirable to establish a partial bleed of air to the atmosphere.

Suitable tapped connections 322 and 323 respectively located upstream from the outlet end of outlet portion 316 of venturi 309 and at the venturi throat 318 are provided to permit the connection of a suitable flow meter for rough field calculations of air flow or a suitable differential pressure fuel control valve desired in event variable speed operation of turbine 331 rather than constant speed operation is desired.

Preferably elbow 310 and venturi 309 are respectively provided with guide vanes 324 and 325 for guiding the air and preventing undesirable eddying due to the change in direction of flow.

The axial flow compressor-turbine engine 331 of Figure 6 is particularly adapted for use on a wheeled cart 332 as diagrammatically illustrated in Figures 10 and 11 of the drawings to provide a mobile ground power unit for servicing grounded aircraft. As shown, flow limiting venturi 309 is connected through tubular conduit 319 to supply bleed air from the compressor scroll at a temperature of 300° to 450° F. to a conventional refrigerating unit 334, the outlet 335 of which is adapted for selective connection to supply conditioned air to the flight deck air conditioning system of a grounded airplane or to the turbojet or turboprop engine of such a grounded plane for the purpose of starting the plane engines. The engine of Figure 9, if operated solely for the purpose of supplying compressed air, will deliver 3 pounds per second at a pressure ratio of 4.42 (approximately 65 p.s.i.a.).

At the same time that engine 331 is supplying air for the aircraft air conditioning system, mechanical power is available through main drive shaft 98 and gear box 28 for driving a 90 k.v.a. 400 cycle alternator 336, a 28 volt D.-C. starter generator 337 for charging the starting batteries 338 for the compressor turbine unit and driving a blower 339 for circulating cooling air through alternator 336 and an oil cooler 340, and for driving a hydraulic pump unit 341 for discharging hydraulic fluid at 3000 pounds per square inch pressure. This hydraulic fluid is available for supplying the requirements of the hydraulic system of a grounded aircraft. In such usage the power plant can deliver from 2.5 pounds of air per second at 60 p.s.i.a. to 1.5 pounds of air per second at 68 p.s.i.a. while providing a shaft output of from 120 H.P. to 300 H.P.

In addition to the equipment just described the ground cart of the present invention includes a battery preheater unit 342 for heating the batteries when required. The cart is also provided with a 125 gallon fuel tank 343 suspended beneath the cart and a cable reel 345 all housed within a covering housing 346 (shown in dot-dash lines) having an upwardly extending exhaust stack 347 connected to the exhaust scroll 24 for removing the exhaust gases. Housing 346 at the right rear end is provided with a control and instrument panel 348 provided to provide ready access to the controls for the power plant. Since these controls may take any one of several forms and form no part of the present invention they are not disclosed herein. The dry weight of the complete cart illustrated ready for use is approximately 2500 pounds. Its overall dimensions are length 120 inches, height 71 inches and width 58 inches. Fuel consumption ranges from 30 to 60 gallons per hour depending upon load and ambient conditions.

A ground power unit employing the axial flow compressor-turbine power plant of the present invention, due to the greater efficiency of the multi-stage axial flow design as compared to the conventional centrifugal type units now used, providing the air and power output just mentioned can easily meet the component requirements for such units which are:

| Service: | Required output |
|---|---|
| Compressed air for engine starting | 2.5 p.p.s. at 53 p.s.i.a. |
| Electric power | 80 k.v.a. at 400 cycles 120/208 volts. |
| Hydraulic power | 10 g.p.m. at 3000 p.s.i. |
| Cooled or heated air for flight deck air conditioning | 2000 lb./hr. at 40° F., or 150° F., respectively. |

As a matter of fact, the ground power unit of this invention is capable of supplying the first three requirements concurrently or the last three requirements concurrently should occasion to do so arise.

It will be appreciated that performance of the air bleed engine of this application is influenced by the type of speed control used. The two basic choices available are:

(1) To maintain substantially constant speed with a conventional flyweight governor.

(2) Automatically adjust the speed as necessary to maintain a constant or scheduled compressor discharge pressure.

It is felt that the former type of control is preferable where constant speed generator operation as well as a supply of pressurized air is required. The latter type of control is preferable, however, where the generator drive can be ignored since the engine will run no faster than is necessary to suit ambient air conditions and bleed air demand. This latter operation increases engine life to some degree, provides improved fuel economy, and under certain conditions enables a higher rated output air pressure to be specified. Where constant frequency A.-C. electric power as well as compressed air is required, the engine is preferably controlled by a conventional isochronous governor. It has been determined that under varying flow of compressed air at 65 p.s.i.a. the compressor surge line is not approached at zero air bleed within established engine speeds and gas temperature limits. Therefore, it is not necessary to bleed air to the atmosphere to avoid compressor surge during intervals when compressed air is not required. This simplifies the control system and makes for improved fuel economy.

From the foregoing description, it will be apparent that the axial flow compressor-turbine engine of this invention incorporates the following advantages in ground power unit usage:

(1) Relative light weight and small size, important where it may be desirable to transport ground power units by air.

(2) Low maintenance costs.

(3) Low initial cost due to utilization of maximum number of standard and readily available parts of commercial alternative use engines.

(4) Reliable starting in winter.

(5) Ability to use same fuel as the aircraft engine as well as diesel or other low cost fuel.

(6) The rapid increase of air horsepower output of the engine as ambient temperature falls thus providing automatic compensation to meet the demand for engine starting power which also increases with lowering ambient temperature.

Inlet air to the compressor preferably enters through a filter panel and silencer unit 351 of the general type disclosed in the aforementioned Wosika Patent No. 2,801,518. Based on experience with this type of silencing, the sound level at a 10-foot radius around the ground power unit during operation should not exceed 90 decibels.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a dual shaft variable speed turbine engine comprising an axial flow compressor, a compressor outlet scroll, an axial flow multi-stage turbine assembly having first rotor means drivingly connected to said compressor and additional normally independently rotatable rotor means adapted for selective connection to said first rotor means to supplement the driving torque on the compressor, a turbine inlet scroll, a combustion chamber interconnecting said compressor outlet scroll and said turbine inlet scroll, a turbine casing connected to said turbine inlet scroll and adapted to direct the combustion gases from said combustion chamber successively through said several turbine stages to drive the turbine rotors of the successive turbine stages, and shaft means connected to said compressor and providing a power take-off shaft at the end of said compressor remote from said turbine assembly; means for converting said dual shaft variable speed turbine engine to a single shaft constant speed engine comprising first coupling means on said first rotor means immediately adjacent said additional normally independently rotatable rotor means; opposed coupling means on said normally independently rotatable rotor means; a coupling ring disposed between said respective rotor means and having peripherally opening key seats therein; and T-shaped keys mounted in said key seats with their stem portions extending radially outwardly to interconnect said first coupling means and said opposed coupling means to thereby connect said respective rotors for unitary rotation and convert said normally variable speed dual shaft engine to a constant speed single shaft engine.

2. In a compressor turbine power plant, an air compressor, a combustion chamber and a multi-stage gas turbine assembly arranged in series fluid communication, said turbine assembly comprising first peripherally bladed axial flow rotor means operatively connected to drive said compressor in a predetermined direction of rotation, additional peripherally bladed axial flow rotor means operative to rotate in the same direction as said first rotor means and disposed in axial alignment and concomitant juxtaposition to the low pressure end of said rotor means, a stator axially interposed between the blades of said first and second rotor means, selectively connectable coupling means on the low pressure end face of said first rotor means and the high pressure end face of said additional rotor means adapting said additional rotor for alternative direct connection to said first rotor means to drive said compressor with said first rotor means and operation as an independent power source, said additional rotor means being directly connected to said first rotor means through a coupling assembly comprising a threaded annulus carried by said first rotor means, a coupling ring having annularly spaced peripherally disposed axially extending slots adapted to form seats for a plurality of coupling keys, opposed annular axially extending flanges formed on the opposing faces of said respective rotor means in surrounding relation to said coupling rings and having mating opposed notches in their respective end faces, a plurality of T shaped coupling keys disposed with their cross-arms in said seats and their stems extending radially into the opposed notches of said flanges, and a headed securing bolt having a shank extending successively through said additional rotor means, said coupling ring and said first rotor means and terminating in a threaded end engaged with said annulus to secure said additional rotor means and said coupling assembly against relative movement with respect to said first rotor means.

3. In a compressor turbine power plant, an air compressor, combustion chamber, and a multi-stage gas turbine assembly arranged in series fluid communication, said turbine assembly comprising first peripherally bladed axial flow rotor means operatively connected to drive said compressor in a predetermined direction of rotation, additional peripherally bladed axial flow rotor means operative to rotate in the same direction as said first rotor means and disposed in axial alignment and concomitant juxtaposition to the low pressure end of said first rotor means, a stator axially interposed between the blades of said first and second rotor means, and selectively connectable coupling means on the low pressure end face of said first rotor means and the high pressure end face of said additional rotor means adapting said additional rotor for alternative direct connection to said first rotor means to drive said compressor with said first rotor means and operation as an independent power source, said first rotor means comprising the rotors of at least two succeeding turbine stages coupled together for unitary rotation; said additional rotor means comprising the rotor of the next succeeding rotor stage; and said coupling means comprising opposed annular radially outwardly disposed axially extending flanges formed on the opposed hub faces of the rotor of the second of said two succeeding turbine stages and the rotor of said next succeeding rotor stage, opposed annularly spaced end opening notches extending radially through said opposed flanges and having a depth slightly less than the axial length of said opposed flanges, and a chamber formed by the opposed respective flanges for selectively receiving the heads of oppositely extending turbine rotor securing bolts on a coupling ring assembly for directly connecting said opposed hub faces.

4. In combination in a compressor-gas turbine power plant, an air compressor having a casing, a combustion chamber and a multi-stage gas turbine assembly arranged in series fluid communication and with said turbine assembly in axial alignment with said compressor, said turbine assembly comprising first turbine means embodying a stator equipped casing fixed to said compressor casing and a rotor cantilever supported and journalled thereon at its end adjacent said compressor and operatively connected to drive said compressor, second turbine means disposed at the low pressure end of and in axial alignment with and concomitant juxtaposition to said first turbine means and embodying a casing separably connected in fluid tight relation with the casing of said first turbine means and a rotor mounted for rotation within said second turbine means casing and adapted to be fixed to the low pressure end of the rotor of said first turbine means to drive said compressor along with the rotor of said first turbine means and adapted to be independently journalled about an axis fixed relative to the casing of said second turbine means and operated independently of the rotor of said first turbine means to serve as a separate power takeoff, the rotor of said first turbine means being operatively connected to said compressor and comprising a shaft having a splined coupling at one end by which it is connected to the compressor and a threaded annulus at its other end, a first centrally apertured turbine rotor stage fixed to the other end of said shaft, a second centrally apertured turbine rotor stage disposed in adjacent series relation to said first turbine rotor stage, axially separable coupling means for drivingly connecting said first and second turbine rotor stages; and securing means comprising a shank extending through the central apertures of said first and second rotor stages and threaded into said threaded annulus to clamp said rotor stages to said shaft and against relative axial movement for preventing axial separation of said coupling means.

5. A sub-assembly for gas turbine power plants which may be utilized selectively in the assembly of unitary turbine assembly power plants of differing volumetric capacity and of split-turbine assembly power plants providing independent power takeoffs at opposite ends of the power plant, said sub-assembly comprising an air compressor having a casing and a rotor journalled thereon, a hollow turbine casing fixed to said compressor casing at one end thereof and having an annular axially extending inlet opening at the end thereof adjacent said compressor, a compressor outlet duct fixed to said compressor casing and having an inlet in fluid communication with the high pressure end of said compressor, a turbine inlet duct fixed to said turbine casing and having an outlet in fluid communication with said turbine casing inlet opening, a combustion chamber connected in series fluid communication between a first outlet of said compressor outlet duct and the inlet of said turbine inlet duct, said compressor outlet duct having a second outlet opening through which high pressure air may be transmitted to a point of use as compressed air and means thereabout adapted to permit detachable attachment of a closure member to said compressor outlet duct to close said second outlet opening, said turbine casing embodying a plurality of axially spaced sections providing a like plurality of concentric internal annular surfaces concentric with the compressor rotor rotation axis and the turbine casing inlet opening and of progressively increasing diameter with the smallest diameter surface being adjacent said inlet opening, alternate ones of said sections being each adapted to support any selected one of the plurality of a distinct series of liner rings the rings of which have like outside diameters and are adapted to snugly interfit the surface of said section and different internal diameters whereby the internal diameter of the passage through said such alternate sections can be adapted to accommodate peripherally bladed turbine rotor stages of differing blade tip diameters, each of the sections interposed between said alternate sections being adapted to support in concentric relation with said compressor rotor and in axially fixed relation to said turbine casing a selected one of a series of annular bladed stator sections of varying flow passage cross section whereby a stator properly proportioned to the selected turbine stages can be inserted in said casing, the one of said sections at the low pressure end of said turbine casing being one of said alternate sections, said one section having means at its high pressure end providing a separable fluid tight connection between said one section and the next adjacent casing section whereby such connection can be made rigid and flexible alternatively in accord with the use of said assembly in unitary and split wheel turbine assemblies respectively, and having means at the low pressure end adapting said section for connection in fluid tight relation to a turbine exhaust conduit.

6. The combination defined in claim 4 wherein said securing means comprises a headed rotor securing bolt disposed with its head in overlapping relation to the end face of the rotor of said second turbine means remote from said shaft and its shank successively extending through the rotor of said second turbine means, said second turbine rotor stage, said first turbine rotor stage and terminating in a threaded end threadedly engaging said annulus, and the rotors of said first and second turbine means are connected for unitary rotation by removable coupling means disposed therebetween and held against disassembly by cooperating axially extending annular flange elements formed on the opposed end faces of the rotors of said turbine means.

7. In combination in a compressor turbine power plant, an air compressor having a casing, a combustion chamber and a multi-stage gas turbine assembly arranged in series fluid communication and with said turbine assembly in axial alignment with said compressor, said turbine assembly comprising first turbine means embodying a stator equipped casing fixed to said compressor casing and a rotor cantilever supported and journalled therein at its end adjacent said compressor and operatively connected to drive said compressor, and second turbine means disposed at the low pressure end of and in axial alignment and concomitant juxtaposition to said first turbine means and embodying a casing separably connected in fluid tight relation with the casing of said first turbine means and a centrally apertured rotor adapted to be operatively connected to the low pressure end of the rotor of said first turbine means to drive said compressor along with the rotor of said first turbine means and adapted to be independently mounted and operate independently of the rotor of said first turbine means to serve as a separate power takeoff, the rotor of said first turbine means being operatively connected to said compressor and comprising a shaft having a spline coupling at one end connected to the compressor and a threaded annulus at its other end, a first centrally apertured turbine rotor stage fixed to the other end of said shaft, a second centrally apertured turbine rotor stage disposed in adjacent series relation to said first turbine rotor stage, axially separable coupling means for drivingly connecting said first and second turbine rotor stages; and securing means comprising a shank extending through the central apertures of said first and second rotor stages and threaded into said threaded annulus to clamp said rotors to said shaft and against relative axial movement for preventing axial separation of said coupling means, said securing means comprising a headed rotor securing bolt disposed with its head in overlapping relation to the end face of said second turbine rotor stage remote from said shaft and its shank successively extending through said second turbine rotor stage, said first turbine rotor stage and terminating in a threaded end threadedly engaging said annulus, the rotor of said second turbine means comprising a power takeoff shaft coaxially supported for rotation about an axis fixed relative to said second turbine means casing in series spaced relation to said second turbine rotor stage and at least one coaxially arranged turbine rotor stage mounted for rotation with said takeoff shaft and disposed in juxtaposition to said second turbine rotor stage.

8. In combination in a compressor turbine power plant, an air compressor, a combustion chamber and a multi-stage gas turbine assembly arranged in series fluid communication, said turbine assembly comprising first peripherally bladed axial flow rotor means operatively connected to drive said compressor in a predetermined direction of rotation, additional peripherally bladed axial flow rotor means operative to rotate in the same direction as said first rotor means and disposed in axial alignment and concomitant juxtaposition to the low pressure end of said first rotor means, a stator axially interposed between the blades of said first and second rotor means, and selectively connectable coupling means on the low pressure end face of said first rotor means and the high pressure end face of said additional rotor means adapting said additional rotor means for alternative direct connection to said first rotor means to drive said compressor along with said first rotor means and operate as an independent power source, said first rotor means comprising a compressor drive shaft and a plurality of axial flow turbine rotor stages arranged in series fluid communication, said additional rotor means comprising at least one turbine rotor stage adjacent the last of said plurality of turbine rotor stages and a removably associated power takeoff shaft arranged in serial relation to said plurality of turbine rotors, and said respective rotor means being connected to function as independent power sources through a coupling assembly comprising a first threaded annulus secured to said compressor shaft, a second threaded annulus secured to said power takeoff shaft, a first headed securing bolt having a shank extending successively through said plurality of turbine rotors and terminating a threaded end engaged with said first threaded annulus to dispose said head between said first and second rotor means and secure said shaft and plurality of turbine rotors of said first rotor means together for unitary rotation and a second headed securing bolt having a shank extending in a direction opposite the shank of said first headed securing bolt through said additional rotor means and terminating in a threaded end engaged with said second threaded annulus to secure said additional rotor means and said power takeoff shaft for independent unitary rotation independently of said first rotor means.

References Cited in the file of this patent

UNITED STATES PATENTS

| | | |
|---|---|---|
| 2,445,973 | Sawyer | July 27, 1948 |
| 2,455,458 | Whittle | Dec. 7, 1948 |
| 2,482,791 | Nettel et al. | Sept. 27, 1949 |
| 2,591,540 | Grylls | Apr. 1, 1952 |
| 2,619,797 | Haworth | Dec. 2, 1952 |
| 2,625,047 | Wood | Jan. 13, 1953 |
| 2,631,427 | Rainbow | Mar. 17, 1953 |
| 2,650,060 | Stalker | Aug. 25, 1953 |
| 2,654,220 | Boestad et al. | Oct. 6, 1953 |
| 2,660,033 | Bowden et al. | Nov. 24, 1953 |
| 2,660,399 | Robinson et al. | Nov. 24, 1953 |
| 2,672,013 | Lundquist | Mar. 16, 1954 |
| 2,675,174 | McDowall et al. | Apr. 13, 1954 |
| 2,707,865 | Huebner | May 10, 1955 |
| 2,770,946 | Savin | Nov. 20, 1956 |
| 2,832,193 | Wood | Apr. 29, 1958 |

FOREIGN PATENTS

| | | |
|---|---|---|
| 459,368 | Italy | Sept. 5, 1950 |